United States Patent [19]

Türck

[11] 4,212,785
[45] Jul. 15, 1980

[54] PROCESS FOR THE PREPARATION OF COPOLYMERS USEFUL AS VISCOSITY-RAISING AGENTS

[75] Inventor: Ulrich Türck, Marl, Fed. Rep. of Germany

[73] Assignee: Chemische Werke Huels A. G., Marl, Fed. Rep. of Germany

[21] Appl. No.: 937,884

[22] Filed: Aug. 29, 1978

[51] Int. Cl.$^2$ .............................................. C08L 33/02
[52] U.S. Cl. ................................ 260/29.7 H; 526/317
[58] Field of Search .................... 260/29.7 H; 526/317

[56] References Cited

U.S. PATENT DOCUMENTS

| | | | |
|---|---|---|---|
| 2,952,564 | 9/1960 | Traverso | 260/29.7 H |
| 2,952,565 | 9/1960 | Contois | 260/29.7 H |
| 3,392,048 | 7/1968 | Rolik | 526/317 |
| 3,657,175 | 4/1972 | Zimmerman | 260/29.6 T |
| 3,903,035 | 9/1975 | Affeldt | 260/29.7 H |
| 3,941,912 | 3/1976 | Tajima | 260/29.7 H |

FOREIGN PATENT DOCUMENTS 1271282  4/1972  United Kingdom.

*Primary Examiner*—Paul R. Michl
*Attorney, Agent, or Firm*—Millen & White

[57] ABSTRACT

In a process for the preparation of a viscosity raising copolymer, which comprises copolymerizing at an elevated temperature (a) methacrylic acid, (b) a conjugated diolefin, and (c) an ester of an $\alpha,\beta$-ethylenically unsaturated dicarboxylic acid, an improvement is provided wherein (a) 50–60% by weight of methacrylic acid, (b) 15–49% by weight of a conjugated diolefin, and (c) 1–25% by weight of fumaric acid dialkyl ester, maleic acid dialkyl ester or a mixture thereof, wherein each alkyl is of 1–8 carbon atoms, are copolymerized in an aqueous emulsion having a phase ratio of monomer mixture:water of 1:1.7 to 1:2.5, wherein, based on the monomer content, the aqueous phase contains 0.02–1% by weight of an alkaline compound, 0.05–1% by weight of an initiator, 0.01–1% by weight of a molecular weight regulator and 0.1–5% by weight of an emulsifier.

4 Claims, No Drawings

PROCESS FOR THE PREPARATION OF COPOLYMERS USEFUL AS VISCOSITY-RAISING AGENTS

BACKGROUND OF THE INVENTION

The present invention relates to a process for the elevated temperature preparation of copolymers comprising monomers of methacrylic acid, conjugated diolefins and esters of $\alpha,\beta$-ethylenically unsaturated dicarboxylic acids which serve as viscosity-raising agents.

Viscosity-raising agents (thickeners) are used, inter alia, as auxiliary agents in coating compositions for the paper and textile industry. Natural as well as synthetic compounds are employed in such agents. The synthetic products are of special interest industrially since they can be obtained in uniform quality.

One group of such synthetic products is constituted by dispersions of copolymers produced from a conjugated diolefin and methacrylic acid. Optionally, esters of $\alpha,\beta$-unsaturated dicarboxylic acids can also be included. Thus for example, DE-OS (German Unexamined Laid-Open Application) No. 2,035,919=GB-PS No. 1,271,282 discloses dispersions of copolymers of butadiene and an unsaturated carboxylic acid as thickeners. A disadvantage connected with these products is that the polymerization of the dispersions described in the reference can be controlled only with great difficulty due to the vigorous evolution of heat.

Furthermore, other thickeners containing dispersions are disclosed in DE-OS No. 2,025,696=U.S. Pat. Nos. 3,657,175 and 2,250,977=U.S. Pat. No. 3,903,035.

These are composed of at least terpolymers of butadiene, an unsaturated carboxylic acid, as well as half esters of $\alpha,\beta$-unsaturated dicarboxylic acids. An essential disadvantage of these products is the requirement that the ester monomers must be separately produced, since they are not commercially available. As a result, these thickeners are unacceptably expensive.

SUMMARY OF THE INVENTION

Accordingly, it is an object of the present invention to provide a process for manufacturing thickeners which can be satisfactorily and economically prepared on a large industrial scale, using commercially available products, and which exhibit excellent viscosity-raising properties.

Upon further study of the specification and appended claims, further objects and advantages of this invention will become apprent to those skilled in the art.

These objects have been attained by providing in a process for the preparation of a viscosity-raising copolymer, which comprises copolymerizing at an elevated temperature (a) methacrylic acid, (b) a conjugated diolefin, and (c) an ester of an $\alpha,\beta$-ethylenically unsaturated dicarboxylic acid, the improvement wherein (a) 50–60% by weight of methacrylic acid, (b) 15–49% by weight of a conjugated diolefin, and (c) 1–25% by weight of fumaric acid dialkyl ester, maleic acid dialkyl ester or a mixture thereof, wherein each alkyl is of 1–8 carbon atoms, are copolymerized in an aqueous emulsion having a phase ratio of monomer mixture:water of 1:1.7 to 1:2.5, wherein based on the monomer content, the aqueous phase contains 0.02–1% by weight of an alkaline compound, 0.05–1% by weight of an initiator, 0.01–1% by weight of a molecular weight regulator and 0.1–5% by weight of an emulsifier.

DETAILED DISCUSSION

All parameters of the process of this application not otherwise discussed herein are fully conventional and are disclosed, for example in DOS's Nos. 2,035,919, 2,025,696 and 2,250,977, the contents of which are incorporated by reference herein.

Suitable conjugated diolefins contain 4–5 carbon atoms.

Butadiene is preferably employed as the conjugated diolefin. However, it is also possible to utilize other 1,3-diolefins, such as isoprene, chloroprene, or piperylene, or mixtures thereof with each other or butadiene. The preferred amount of conjugated diolefin is in the range of 28%–42% by weight.

Suitable $\alpha,\beta$-unsaturated dicarboxylic acid ester monomers are fumaric acid dialkyl esters and/or maleic acid dialkyl esters. The two alkyl moieties in the ester portions may be the same or different and each may contain up to 8 carbon atoms, preferably 2–6 carbon atoms. The alkyl groups may be branched or straight chain. Suitable alcohols for conventionally preparing the esters include, inter alia, ethanol, butanol, hexanol and 2-ethylhexanol, preferably butanol. For the process of this invention, the esters are preferably employed in amounts of 5–15 % by weight. Fumaric acid dibutyl ester has proven to be particularly advantageous.

By use of such an ester component, it becomes possible, inter alia, to lessen the very large amount of heat of polymerization, liberated per unit time in the conventional system of butadiene/methacrylic acid, to a level tolerable for practical conditions. This lowering of the heat makes it feasible to conduct the polymerization in large-scale reactors (>20 m$^3$). A further advantage of the thickeners prepared according to the process of this invention is that their viscosity-raising effect is stronger in comparison with that of the prior art thickness.

The third monomer component is methacrylic acid. This is preferably employed in an amount of about 53–57% by weight. If the methacrylic acid proportion is less than the lower limit of 50% by weight according to this invention, the resultant dispersions are insufficient as thickeners, and the reaction can no longer be thermally controlled, even considering the other parameters of this invention. On the other hand, if the proportion of methacrylic acid is larger than 60% by weight, coagulate is produced in great quantities. Substitution of methacrylic acid by a carboxylic acid such as acrylic acid, produces useless products.

In order to maintain the reaction velocity and the heat of reaction at a manageable order of magnitude under practical conditions, other features are also critical for the process of this invention.

Thus, it is essential to maintain the phase ratio of monomer mixture (i.e., all monomers):water in the range of 1:1.7 to 1:2.5, preferably 1:1.8 to 1:2.3. With an insufficient proportion of water, the heat of reaction can no longer be removed with adequate safety, and an increased formation of coagulate occurs. With a proportion of water which is too high, the reaction velocity surprisingly rises to such an extent that the polymerization can no longer be controlled.

Another essential feature of the reaction is the use in the reaction mixture of alkaline compounds (i.e., compounds otherwise compatible with the reaction mixture, which raise the pH thereof), preferably in an amount of 0.05–0.5% by weight—based on the monomer content.

Suitable compounds in this connection include alkaline compounds which are water-soluble and/or which form water-soluble salts with methacrylic acid, such as, for example, ammonia, alkali metal (e.g., Na, K) hydroxides; and amines such as di-, tri-$C_{1-4}$alkylamines, wherein the alkyl moieties of such amines may be substituted, e.g. by OH; mono-, di-, tri-, tetra- etc. -$C_{2-4}$alkylene - di-, tri-, tetra-, penta- etc. -amines, wherein the N-atom(s) may be substituted, e.g., by acetate; $C_{5-7}$ aliphatic cyclic amines, e.g., of 1–2 N atoms and optionally an O atom; heterocyclic aromatic amines; and aryl, e.g., phenyl, substituted amino; such as triethylamine, mono-, di-, triethanolamine, ethylenediamine, ethylenediaminemono-, -di-, -tri-, tetraacetate, diethylenetriamine, triethylenetetramine, pyridine, piperidine, morpholine, pyrrolidine, aniline, as well as the respective homologous compounds. The organic, nitrogen-containing alkaline compounds are preferably employed.

As a guideline for the amount of alkaline compound to be utilized, the pH value which is assumed by the reaction batch after termination of the polymerization can be used. This value is to be in the range of 3.0–4.4, preferably 3.3–4.1. If the pH value of 4.4 is exceeded after termination of the reaction, then the resultant polymers exhibit too long an induction period, an increased coagulate formation, as well as too low a viscosity-raising activity. At pH values of less than 3.0, the reaction, in turn, proceeds too fast and thus uncontrollably. If the reaction is to proceed under adequate control, an advantageous range for the pH after termination of the polymerization was found to be 3.5–4.1. The use of nitrogen-containing, alkaline compounds which form a redox system with persulfate initiators and which cause the pH value of the reaction mixture to be in the lower portion of the aforementioned range after termination of the reaction, e.g., 3.1–3.4, is of advantage if an agent having an especially strong viscosity-raising effect is to be prepared. Such alkaline compound include triethanolamine, ethylenediamine, tetraacetate etc.

Suitable initiators are those customarily employed in the reaction such as peroxydisulfates, azobiscarboxylic acid nitrile, or similar compounds, preferably ammonium peroxydisulfate and azobisisobutyronitrile. They are preferably employed in amounts of 0.3–0.8% by weight, based on the monomer content. For instance, other suitable initiators are described in one of the aforementioned references (DE-OS No. 2,025,696=U.S. Pat. No. 3,657,175).

To control the molecular weight, molecular weight regulators are added to the polymerization charge. Suitable ones include alkyl mercaptans or dixanthogenic disulfides, preferably tert-dodecylmercaptan. The regulating agents are preferably added in amounts of 0.05–0.5% by weight based on the monomer content. Other suitable regulators are also disclosed in one of the aforementioned references which have been incorporated by reference herein (DE-OS No. 2,025,696=U.S. Pat. No. 3,657,175).

Suitable emulsifiers include anionic compounds derived from strong acids, i.e., alkyl sulfates and sulfonates, olefin sulfonates, alkylaryl sulfonates, α-fatty acid sulfonates, alkylphenylene oxide sulfonates, fatty alcohol polyglycol ether sulfates, alkyl phenol polyglycol ether sulfates and/or the corresponding phosphates. Optionally, mixtures of the aforementioned emulsifiers can also be employed. Preferred emulsifiers are dodecylbenzene sulfonates. They are used preferably in amounts of 0.5–3% by weight based on the monomer content.

A suitable reaction temperature is usually in the range of 35° C.–60° C., preferably between 40° C. –50° C., wherein the level of the selected reaction temperature can be made dependent on the progression of the polymerization reaction. Suitable reaction times are 7–20 hours, preferably 9–12 hours. Reaction pressure is not critical; normally the reaction pressure is equivalent to the pressure of butadiene, which is evaluated by the reaction temperature. Both the order and rates of addition of all reaction components are not critical. Moreover, the process of this invention can be conducted continuously as well as discontinuously; the discontinuous polymerisation is preferred.

When the parameters required by this invention are satisfied, it is possible to conduct the process with optimum results, i.e., the reaction proceeds sufficiently rapidly to satisfy practical requirements without the evolution of heat becoming too high and without the polymerization becoming uncontrollable.

The products obtained according to the process of this invention are mechanically stable dispersions having a low coagulate content and an excellent activity in raising the viscosity e.g., of coating compositions. Suitable such compositions whose viscosity can be raised by the dispersions of this invention include conventional coating compositions, e.g. prepared for paper, containing as a binder styrene/butadiene- or styrene/acrylate-latices. Such compositions are disclosed for example in the monograph of TAPPI Coating Conference 1974, New Orleans—p. 135, whose disclosures are incorporated by reference herein. Generally, from 2–35 wt. parts, preferably 5–15 wt. parts, of thickener of this invention are employed per 100 wt. parts of the solids content of the latex used as a binder in coating compositions. The thickeners of this invention are used analogously to the use of conventional thickeners, e.g. dispersions of vinylacetate-(co)polymers as disclosed in the monograph of TAPPI Coating Conference 1974, New Orleans—p. 135.

To determine the viscosity-raising effect, the dispersions of this invention, e.g., those described in the examples, are diluted to a solids content of 1.5% by weight by addition of, e.g., water.

The pH value is then adjusted uniformly to 8.5 by addition of, e.g. ammonia.

The viscosity was then determined in a rotary viscometer at a shear gradient of 111/sec.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth in degrees Celsius; unless otherwise indicated, all parts and percentages are by weight.

EXAMPLE 1

A 12-liter polymerization reaction is charged with
200 parts by weight of water
0.1 part by weight of pyridine
2 parts by weight of dodecylbenzene sulfonate
55 parts by weight of methacrylic acid
15 parts by weight of dibutyl fumarate 0.2 part by weight of tert-dodecyl mercaptan and
0.5 part by weight of ammonium peroxydisulfate.

After purging with nitrogen and evacuation, 30 parts by weight of butadiene is added. The batch is heated within 2 hours to 50° C. The conversion rate is 25% per hour. The deposits in the reactor are 0.1% of the total content. The solids content of the dispersion amounts to 33.5%; the pH value is 3.4; and the viscosity is 346 mPas.

EXAMPLE 2

A 12-liter polymerization reactor is charged with
200 parts by weight of water
0.3 part by weight of triethanolamine
2 parts by weight of dodecylbenzene sulfonate
55 parts by weight of methacrylic acid
15 parts by weight of dibutyl maleate
0.2 part by weight of tert-dodecyl mercaptan
0.5 part by weight of ammonium peroxydisulfate and
30 parts by weight of butadiene.

The polymerization is conducted analogously to Example 1. The conversion rate is 15% per hour. The dispersion is free of coagulate; the solids content is 33.6%; the pH value is 3.3; and the viscosity is 363 mPas.

EXAMPLE 3

A 12-liter polymerization reactor is charged with
200 parts by weight of water
0.3 part by weight of triethanolamine
2 parts by weight of dodecylbenzene sulfonate
55 parts by weight of methacrylic acid
10 parts by weight of bis(2-ethylhexyl)fumarate
0.2 part by weight of tert-dodecyl mercaptan
0.5 part by weight of ammonium peroxydisulfate and
35 parts by weight of butadiene The mixture is heated within 2 hours to 45° C. The conversion rate is 20% per hour. The dispersion is free of coagulate; the solids content is 33.7%; the pH value is 3.7; and the viscosity is 604 mPas.

EXAMPLE 4

A 12-liter polymerization reactor is charged with
200 parts by weight of water
0.5 parts by weight of ethylenediaminetetraacetate
2 parts by weight of dodecylbenzene sulfonate
55 parts by weight of methacrylic acid
5 parts by weight of dibutyl fumarate
0.2 part by weight of tert-dodecyl mercaptan
0.5 part by weight of ammonium peroxydisulfate and
40 parts by weight of butadiene.

The polymerization is conducted in accordance with Example 3. The conversion rate is 25% per hour. The dispersion is free of coagulate; the solids content is 34.5%; the pH value is 4.2; and the viscosity is 1,037 mPas.

EXAMPLE 5

Experiments I through V correspond to Example 1, except for the alkaline compound.

| Experiment | Parts by weight | Alkaline Compound | Conversion [% per Hour] | Proportion of Coagulate [%] | pH | Viscosity [mPas] |
|---|---|---|---|---|---|---|
| I | 0.05 | Triethylamine | 23 | 0.2 | 3.0 | 406 |
| II | 0.15 | Ammonia | 21 | 0 | 3.4 | 255 |
| III | 0.1 | Sodium hydroxide | 22 | 0.2 | 3.8 | 260 |
| IV | 1.0 | Triethanolamine | 20 | 0.5 | 4.4 | 121 |
| V | 0.5 | Ethylenediamine-tetraacetate | 25 | 0.1 | 4.0 | 591 |

EXAMPLE 6

Experiments I through IV are conducted according to Example 5(V).

| Experiment | Methacrylic Acid [%] | Butadiene [%] | Dibutyl Fumarate [%] | Viscosity [mPas] |
|---|---|---|---|---|
| I(*) | 55 | 45 | — | 398 |
| II | 55 | 40 | 5 | 1,166 |
| III | 55 | 35 | 10 | 871 |
| IV | 55 | 30 | 15 | 591 |

(*)This experiment is not in accordance with the invention.

EXAMPLE 7

Example 7 corresponds to Example 5 (V), but with the use of 0.4 part by weight of azobisisobutyronitrile as the initiator instead of 0.5 part by weight of ammonium peroxydisulfate. The polymerization temperature is 45° C. The proportion of coagulate is 0.2%; the pH is 3.7; the viscosity is 621 mPas; and the conversion rate is 23% per hour.

COMPARATIVE EXAMPLE A

Comparative Example A corresponds to Example 5 (V), but only 40 parts by weight of methacrylic acid are used, and additionally 40 parts by weight of butadiene and 20 parts by weight of dibutyl fumarate are used. The conversion rate is 90% per hour, i.e., the reaction becomes uncontrollable; the proportion of coagulate in the dispersion is 0.5%; the pH is 4.8; and the viscosity drops to 37 mPas.

COMPARATIVE EXAMPLE B

Comparative Example B corresponds to Example 5 (V), but in place of methacrylic acid, acrylic acid is employed. A conversion of merely about 40% is obtained. The batch coagulates completely.

COMPARATIVE EXAMPLE C

Comparative Example C corresponds to Example 5 (V), but dibutyl fumarate is omitted as the comonomer. 45 parts by weight of butadiene is employed. The conversion rate is 35% per hour and the batch can hardly be controlled. The pH value of the dispersion is 4.1 and the viscosity is 398 mPas.

COMPARATIVE EXAMPLE D

Comparative Example D corresponds to Example 5 (V), but only 150 parts by weight of water are used. The proportion of coagulate is 20%. The conversion rate is 28% per hour. The pH value of the dispersion is 3.9 and the viscosity is 147 mPas.

COMPARATIVE EXAMPLE E

Comparative Example E corresponds to Example D, but 300 parts by weight of water are used. The conversion rate is 55% per hour and the batch cannot be controlled.

COMPARATIVE EXAMPLE F

Comparative Example F corresponds to Example 5 (V), but 1.2 parts by weight of ethylenediaminetetraacetate are used. The conversion rate is 16% per hour. The proportion of coagulate rises to 10%. The pH value of the dispersion is 4.5 and the viscosity is 185 mPas.

COMPARATIVE EXAMPLE G

Comparative Example G corresponds to Example 1, but no alkaline compound is used. The reaction rate now is 55% per hour and the batch can no longer be controlled. The pH value of the dispersion is 2.8.

The examples denoted by letters are not in accordance with the invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of a viscosity-raising copolymer, which comprises copolymerizing at an elevated temperature (a) methacrylic acid, (b) a conjugated diolefin, and (c) an ester of an $\alpha,\beta$-ethylenically unsaturated dicarboxylic acid, the improvement wherein (a) 50–60% by weight of methacrylic acid, (b) 15–49% by weight of a conjugated diolefin, and (c) 1–25% by weight of fumaric acid dialkyl ester, maleic acid dialkyl ester or a mixture thereof, wherein each alkyl is of 1–8 carbon atoms, are copolymerized in an aqueous emulsion having a phase ratio of monomer mixture:water of 1:1.7 to 1:2.5, wherein, based on the monomer content, the aqueous phase contains 0.02–1% by weight of an alkaline compound, 0.05–1% by weight of an initiator, 0.01–1% by weight of a molecular weight regulator and 0.1–5% by weight of an emulsifier.

2. The process of claim 1, wherein 53–57% by weight of methacrylic acid, 28–42% by weight of butadiene, and 5–15% by weight of fumaric acid dibutyl ester are copolymerized in an aqueous emulsion at a phase ratio of monomer mixture:water of 1:1.8 to 1:2.3, wherein the aqueous phase, based on the monomer content, contains 0.05–0.5% by weight of an organic, nitrogen-containing, alkaline compound; 0.3–0.8% by weight of an initiator; 0.05–0.5% by weight of tert-dodecyl mercaptan as the regulator; and 0.5–3% by weight of an alkyl benzenesulfonate as the emulsifier.

3. The process of claim 1, wherein the alkaline compound is ammonia, an alkali metal hydroxide, triethylamine, mono-, di-, triethanolamine, ethylenediamine, ethylenediamine-, mono-, -di-, -tri-, -tetraacetate, diethylenetriamine, triethylenetetramine, pyridine, piperidine, morpholine, pyrrolidine or aniline.

4. The process of claim 1, wherein the amount of alkaline compound used in the polymerization batch results in a batch pH of 3.0–4.4 after termination of the polymerization.

* * * * *